United States Patent [19]
Wu et al.

[11] Patent Number: 5,226,002
[45] Date of Patent: Jul. 6, 1993

[54] MATRIX MULTIPLIER CIRCUIT

[75] Inventors: Hug-Di Wu, Taipei; Rong-Yean Lee, Hsinchu; Maing-Ku Yang, Kaohsiung, all of Taiwan

[73] Assignee: Industrial Technology Research Institute, Hsinchu, Taiwan

[21] Appl. No.: 722,948

[22] Filed: Jun. 28, 1991

[51] Int. Cl.$^5$ .................................. G06F 7/52
[52] U.S. Cl. ..................................... 364/754
[58] Field of Search ............... 364/754, 757, 758, 759, 364/715.04

[56] References Cited

U.S. PATENT DOCUMENTS 4,553,220 11/1985 Swanson ........................ 364/715.04
4,841,469 6/1989 Kuenemund et al. ............... 364/754

OTHER PUBLICATIONS

M. T. Sun et al, "A Concurrent Architecture of VLSI Implementation of Discrete Cosine Transform", IEEE Transactions on Circuits and Systems, vol. CAS-34, No. 8, Aug. 1987, pp. 992-994.
M. T. Sun et al, "VLSI Implementation of a 16×16 Discrete Cosine Transform", IEEE Trans. on Circuits & Systems, vol. 36, No. 4, Apr. 1989, pp. 610-617.

*Primary Examiner*—Long T. Nguyen
*Attorney, Agent, or Firm*—Marmorek, Guttman & Rubenstein

[57] ABSTRACT

A matrix multiplier circuit which is based on distributed arithmetic is disclosed. In the conventional matrix multiplier circuit, one row of J elements from a data matrix is multiplied in parallel with K columns of elements from a transform matrix to form one row of elements of an output matrix. In contrast, in the inventive matrix multiplier circuit, N rows of elements from the data matrix are multiplied in parallel with K columns of elements from a transform matrix. Maximum advantage of parallel processing and pipelined processing is achieved if N is the nearest integer to M/J where M is the precision of the elements from the data matrix.

7 Claims, 2 Drawing Sheets

FIG.3

MATRIX MULTIPLIER CIRCUIT

FIELD OF THE INVENTION

The present invention relates to a circuit for multiplying matrices.

BACKGROUND OF THE INVENTION

Conceptually, a two dimensional matrix multiplier circuit functions through use of a multiplier and an accumulator. Recently, distributed arithmetic has been utilized to simplify the design of the multiplier circuit and increase the speed of computation. A multiplier circuit which utilizes distributed arithmetic takes advantage of both pipeline processing and parallel processing. When there is an appropriate match between pipeline processing and parallel processing, throughput is increased. It is an object of the present invention to provide a matrix multiplier circuit based on distributed arithmetic, in which throughput is increased by providing an appropriate match between pipeline processing and parallel processing.

In the field of digital signal processing, matrix multiplication is used extensively to transform a set of data into various domains. For example, the discrete cosine transform, the inverse discrete cosine transform, and the discrete Fourier transform utilize matrix multiplication.

Consider, for example, the matrix multiplication $$X \times B = C \qquad (1)$$

where
X is an input data matrix,
B is a transformation matrix whose elements are constant transform coefficients, and
C is the output data matrix.

The data matrix X is of size I rows $\times$ J columns. The transformation matrix B is of size J rows $\times$ K columns. The output matrix c is of size I rows $\times$ K columns. Thus, the matrix X is comprised of the elements $x_{ij}$ i=1,2,...,I, j=1,2,...,J. The matrix B is composed of the elements $b_{jk}$, k=1,...,K. The matrix C is composed of the elements $c_{ik}$.

Equation (1) can be rewritten as $$C_{ik} = \sum_{j=1}^{J} (x_{ij} \cdot b_{jk}) \qquad (2)$$

The conventional matrix multiplier circuit which utilizes distributed arithmetic multiplies one row of J elements $x_{ij}$ with K columns of elements $b_{jk}$ to obtain one row of elements $c_{ik}$. In the conventional matrix multiplier, pipelining is controlled by the precision (i.e. the number of bits) M in the elements $x_{ij}$, whereas parallel processing is determined by the size J of the X and B matrixes. When M is larger or smaller than J, the pipeline processing and parallel processing in the multiplier circuit are not well matched. It is an object of the present invention to provide a matrix multiplier circuit which utilizes distributed arithmetic and which takes more complete advantage of pipeline and parallel processing to achieve a higher throughput.

SUMMARY OF THE INVENTION

As indicated above, in the conventional matrix multiplier circuit utilizing distributed arithmetic, one row of J elements $x_{ij}$ is multiplied in parallel with K columns of elements $b_{jk}$ to obtain one row of elements $c_{ik}$. In contrast, in accordance with the multiplier circuit of the present invention, N rows of elements $x_{ij}$ are multiplied in parallel with K columns of elements $b_{jk}$ to obtain N rows of elements $c_{ik}$. If M is approximately equal to NJ (in particular, if N is the integer nearest to M/J) the maximum advantage of both pipeline processing and parallel processing is achieved.

More particularly, in accordance with the present invention, a matrix multiplier circuit comprises a first pipeline stage formed from an input shift register for sequentially receiving in bit parallel form over a period of NJ time units a first set of NJ data elements $x_{ij}$ from N rows of the data matrix X. Each data element $x_{ij}$ has a precision of M bits. The first set of NJ data elements is shifted concurrently in bit parallel form to a second pipeline stage. The second pipeline stage serves to multiply in parallel the first set of NJ data elements with the elements $b_{ij}$ from K columns of the transform matrix B. The output of the second stage is N rows of elements $c_{ik}$ of the output matrix C. To perform the multiplications, the second stage utilizes distributed arithmetic so that the multiplications require M time units. While the second pipeline unit is performing multiplications with the first set of NJ data elements, a second set of NJ data elements formed from a plurality of rows from the data matrix is shifted into the input shift register in the first pipeline stage.

Pipeline bottlenecks are eliminated and throughput is optimized if N is approximately equal to M/J. For example, N may be equal to the nearest integer to M/J. In this case, the amount of time required to perform the parallel multiplications in the second pipeline stage is approximately equal to the time required to shift a set of NJ data elements into the shift register of the first pipeline stage.

DETAILED DESCRIPTION OF THE INVENTION

Figure 1:
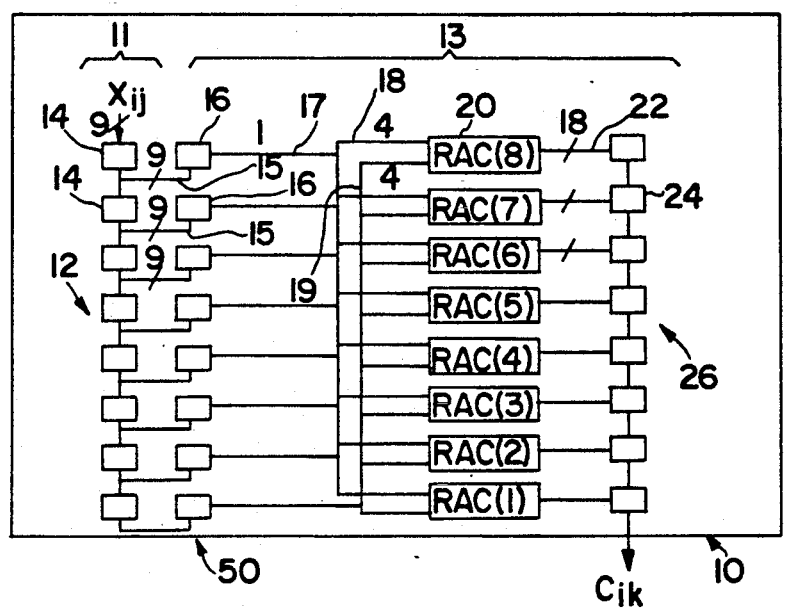
FIG. 1 schematically illustrates a conventional multiplier circuit based on distributed arithmetic.

Before discussing the inventive matrix multiplier circuit in detail, it may be helpful to briefly review the operation of the conventional matrix multiplier circuit based on distributed arithmetic.

As indicated above, the conventional matrix multiplier circuit computes the elements $$C_{ik} = \sum_{j=1}^{J} (x_{ij} \cdot b_{jk}) \qquad (2)$$

In particular, the conventional matrix multiplier multiplies in parallel one row of J elements $x_{ij}$ with K columns of elements $b_{jk}$ to output one row of elements $c_{ik}$.

The value of each data element $x_{ij}$ is represented as $$X_{ij} = (-1)2^{M-1}x_{ij}(M-1) + \sum_{m=0}^{M-2} x_{ij}(m) \cdot 2^m \qquad (3)$$

where $x_{ij}(m)$, $m=0,1,\ldots,M-1$, is the $m^{th}$ bit of $x_{ij}$ which has a value logic 0 or logic 1, M is the number of bits in $x_{ij}$, and $x_{ij}(M-1)$ the sign bit.

Utilizing equation (3), equation (2) can be rewritten as $$C_{ik} = \qquad (4)$$

$$(-1)2^{(M-1)}\left[\sum_{j=1}^{J} x_{ij}(M-1) \cdot b_{jk}\right] +$$

$$\sum_{m=0}^{M-2}\left[\left(\sum_{j=1}^{J} x_{ij}(m) \cdot b_{jk}\right) \cdot 2^m\right]$$

$$= (-1)2^{M-1}S_{ik}(b_{jk}, x_{ij}(M-1)) + \sum_{m=0}^{M-2} S_{ik}(b_{jk}, x_{ij}(m))2^m \qquad (5)$$

Each quantity $$S_{ik}(b_{jk}, x_{ij}(m)) = \sum_{j=1}^{J} x_{ij}(m)b_{jk}$$

$$m = 0, 1, \ldots, M-1$$

may be evaluated as follows. Each quantity $S_{ij}$ is a function of the fixed transformation matrix elements $b_{jk}$. Each quantity $S_{ik}$ can take on $2^J$ possible values because $x_{ij}(m), j-1, \ldots, J$ can take on any one $2^J$ possible patterns of 1's and 0's. Thus, $2^J$ possible values for each quantity $S_{ij}$ are computed in advance and stored in a memory. A particular value of a quantity $S_{ik}$ can then be obtained by using the pattern $x_{ij}(m)$ as the address to a memory storing all the possible values of $S_{ik}$.

The above described distributed arithmetic serves as the basis for implementing the conventional distributed arithmetic multiplier circuit which multiplies in parallel one row of elements $x_{ij}$ from the data matrix X with K columns of elements $b_{jk}$ from the transformation matrix B to obtain one row of elements $c_{ik}$ of the output matrix C.

Such a conventional multiplier circuit is illustrated in FIG. 1. The multiplier circuit 10 of FIG. 1 is illustratively designed to process one row of J elements $x_{ij}$ for the case where J=8 and where each element $x_{ij}$ comprises eight data bits and one sign bit for a total of nine bits. The multiplier circuit 10 of FIG. 1 comprises a first pipeline stage 11 which is formed by a first shift register 12. The shift register 12 comprises J=8 register units 14 each of which is nine bits wide. The data elements $xp_{i1}$, $x_{i2}, \ldots x_{i8}$ are shifted sequentially in time with bit parallel structure into the eight stage, nine-bit wide shift register 12 at the input data rate 1/T. After 8 T time intervals, the contents of each register unit 14 are moved concurrently in bit parallel form via the lines 15 to a second pipeline stage 13 which includes the register units 16. The register units 16 together form a second non-shift register 50.

The second pipeline stage 13 also comprises a plurality of RAC units 20. The detailed structure of a RAC unit 20 is discussed below in connection with FIG. 2. For now it is sufficient to note that each RAC unit 20 includes a ROM for storing all the possible values of $S_{ik}$ for one value of k. There are a total of eight RAC units 20 in the circuit of FIG. 1 so that k takes on the values $k=1,\ldots,K$, $K=8$. The corresponding RAC units are labeled RAC(1), RAC(2), ..., RAC(8). The unit RAC(k) outputs in bit parallel form on the lines 22 the element $c_{ik}$. The bits comprising each element $c_{ik}$ are loaded in bit parallel form into a corresponding register unit 24 of a shift register 26. The elements $c_{i1}, c_{i2}, \ldots, c_{ik}$ are then shifted out of the shift register 26 sequentially in time with bit parallel structure.

Figure 2:
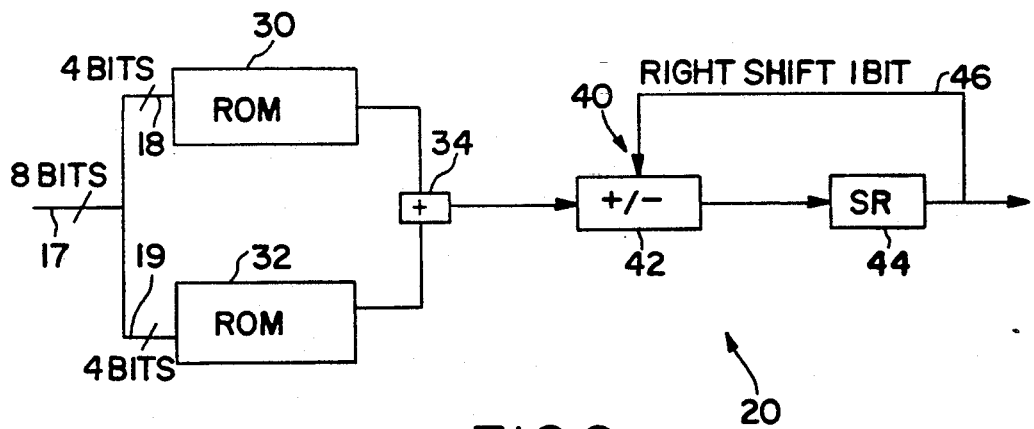
FIG. 2 illustrates an RAC unit for use in the multiplier circuit of FIG. 1.

A RAC unit 20 is illustrated in greater detail in FIG. 2. The RAC unit 20 of FIG. 2 makes use of the technique of partial sums to reduce memory requirements. The RAC unit 20 comprises two ROM units 30 and 32. Each of the ROM units is addressed by a four-bit number and the output of the two ROM units are added by the adder 34. If the technique of partial sums is not utilized, the RAC unit may comprise a single ROM unit which is addressed by an eight-bit number and the adder 34 is eliminated.

The RAC unit 20 also includes an accumulator 40 which is formed from the adder/subtractor unit 42 and the shift register 44. The shift register 44 has a hard wired one-bit shift right which is designed with the label 46.

Returning now to FIG 1, the calculation of the elements $c_{ik}$ proceeds as follows. The bits comprising the data elements $x_{i1}, x_{i2}, \ldots, x_{iJ}$ are concurrently shifted out of the register units 16 in bit serial form on the lines 17. Thus, in each time interval T there appears on the lines 17 a pattern $x_{ij}(m)$. The pattern $x_{ij}(m)$ serves as an address of the ROMs contained in the RAC units 20. Specifically, the eight bits comprising the pattern $x_{ij}(m)$ for each value of m are divided into two four-bit address groups, with one four-bit address group appearing on the lines 18 and one four-bit address group appearing on the lines 19. The four-bit address on lines 18 is utilized to address the ROM 30 in each RAC unit and the four-bit address on line 19 is utilized to address the ROM 32 in each RAC unit. Thus, for each value of m there is successively obtained on the lines 17 a pattern of bits which is used to address the ROMs 30 and 32 in each RAC unit. For each value of m, the outputs of the two ROMs 30 and 32 are summed using the adder 34 to obtain a value of $S_{ik}$. Thus, nine values of $D_{ik}$ (one for each value of m) are obtained sequentially in time at the output of the adder unit 34 in each RAC. For example, the values of $S_{i1}$ are obtained at the output of the adder 34 in the RAC(1) and the values of $S_{i2}$ are obtained in the RAC(2) etc. The sums over m in equations (4) and (5) are evaluated using the accumulator 40 in each RAC unit. In particular, for each successive value of m, $m-0,1,\ldots,M-2$, each corresponding successive value of $S_{ik}$ is added, using the adder/subtractor unit 42, to the contents of shift register 44 with the one-bit shift right. When m reaches $M-1$, the unit 42 performs a subtraction instead of an addition. The resulting output is an element $c_{ik}$ of the output matrix C.

The matrix multiplier circuit 10 of FIG. 1 exploits both pipelined processing and parallel processing. In particular, while one row of data elements is being sequentially entered into the register units 14 of the shift register 12 of the first pipeline stage 11, a row of previously entered data elements, now stored in the register units 16, is processed in parallel by the RAC units. The entering of a row of J data elements $x_{ij}$ into the shift register 12 takes J time units. The processing of a previously entered row of data elements by the RAC units takes M time units. This pipeline works most efficiently if M is approximately equal to J. When the precision of the data elements of the data matrix X is high, i.e. when M>J, the processing by the RAC units becomes a bottleneck in the pipeline, as the shifting of data into the shift register 12 and out of the shift register 26 is much faster than the processing by the RAC units.

The matrix multiplier circuit of the present invention overcomes this bottleneck in the case of high precision data elements by providing a matrix multiplier with a high throughput.

Figure 3:
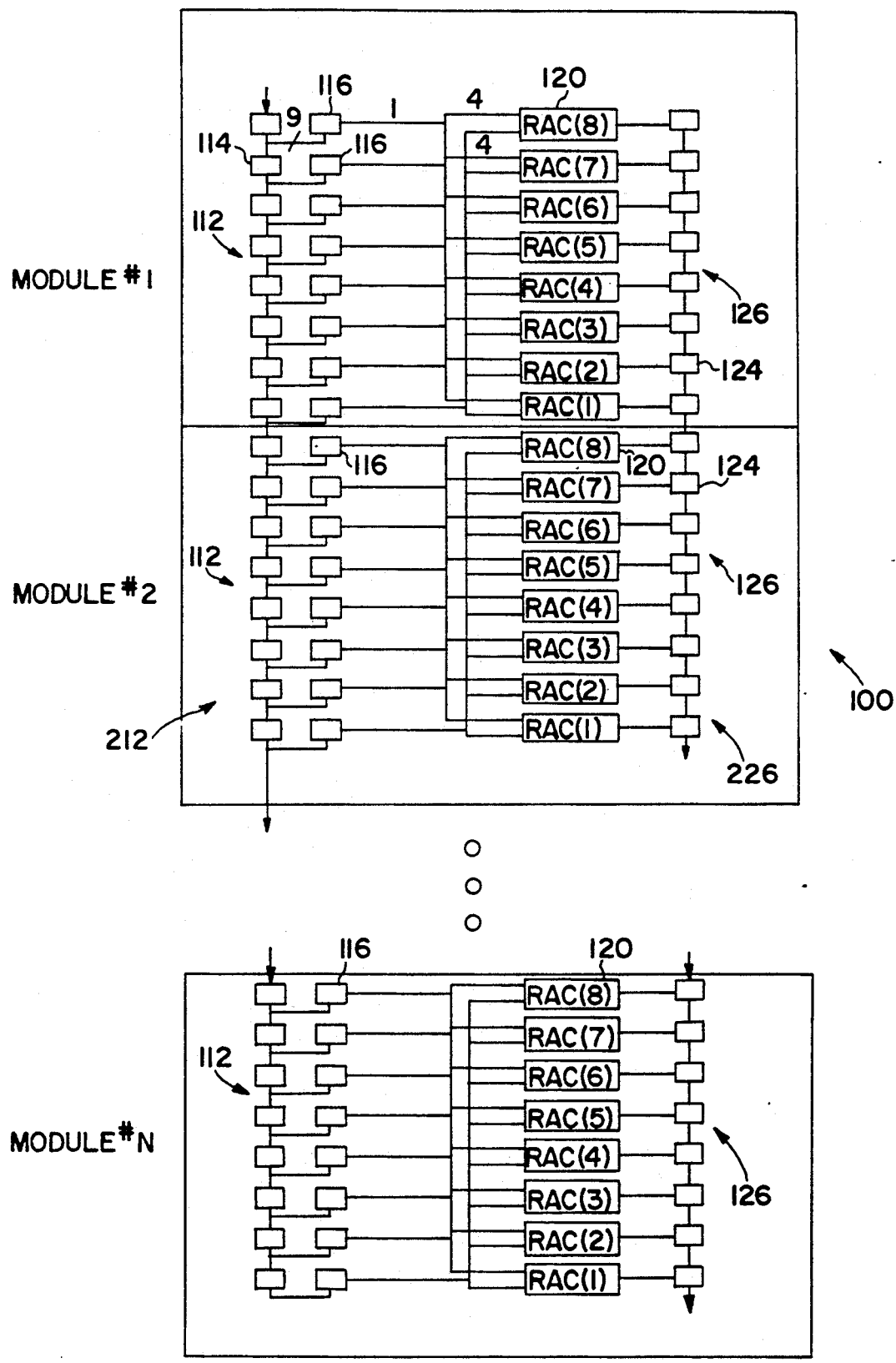
FIG. 3 illustrates a multiplier circuit based on distributed arithmetic in accordance with an illustrative embodiment of the present invention.

FIG. 3 illustrates a matrix multiplier circuit in accordance with an embodiment of the present invention. The matrix multiplier 100 of FIG. 3 has a higher throughput than the matrix multiplier 10 of FIG. 1 for the case where M>J. In particular, the matrix multiplier 100 comprises N modules labeled 1,2, ... ,N. Each of the modules 1,2, ... ,N is identical to the multiplier circuit 10 of FIG. 1. The number of modules N is chosen so that it is approximately equal to M/J, e.g., N may be chosen so that it is equal to the nearest integer to M/J. When N is chosen in this manner there is an optimal matching between pipeline processing and parallel processing in the matrix multiplier circuit.

The matrix multiplier circuit 100 multiplies in parallel NJ elements $x_{ij}$ from N rows of the input data matrix X with K columns $b_{ij}$ of the transform matrix B to output N rows of elements $c_{ij}$ of the output matrix C.

The individual modules in the matrix multiplier circuit 100 of FIG. 3 are interconnected as follows. The input shift registers 112 of each module 1,2, ... ,N are interconnected to form a single shift register 212 comprising NJ individual register units 114. Illustratively, each register unit 114 is nine bits wide. Similarly, the output shift registers 126 of each module 1,2, ... ,N are connected to form a single shift register 226 comprising NJ individual register units 124.

The circuit 100 of FIG. 3 operates to optimally combine parallel and pipelined processing as follows. It takes NJ time units to shift NJ data elements $x_{ij}$ from the data matrix X into the shift register 212. While one set of NJ data elements is being shifted into the shift register 212, a previous set of NJ data elements now stored in the register units 116 are multiplied in parallel with the elements $b_{jk}$ from K rows of the transformation matrix B. As described above, it takes M time units for the RAC units 120 in each module to generate and add the quantities $S_{ik}$ to obtain a value of $c_{ik}$. Because NJ is approximately equal to M there is a good match between pipeline and parallel processing in the circuit 100 of FIG. 3. It should be noted that in the circuit 100 of FIG. 3, NJ elements $c_{ik}$ comprising N rows of the output matrix C are shifted out of the shift register 226 in sequence.

Finally, the above described embodiments of the invention are intended to be illustrative only. Numerous alternative embodiments may be devised by those skilled in the art without departing from the spirit and scope of the following claims.

We claim:

1. A matrix multiplier circuit comprising
a first pipeline stage comprising a first input shift register for sequentially receiving in bit parallel form over a period of NJ time units a first set of NJ data elements from N rows of a data matrix, and
a second pipeline stage which operates concurrently with said first pipeline stage, said second pipeline stage comprising a second register for receiving said first set of NJ elements of said data matrix concurrently in bit parallel form from said first input shift register and for concurrently outputting said first set of NJ elements of said data matrix in bit serial form over a period of M time units, and multiplicating means utilizing distributed arithmetic for multiplying in parallel, over said period of M time units, each of said first set of NJ data elements of said data matrix outputted by said second register with the elements from K columns of a transform matrix to generate N rows of elements of an output matrix, while a second set of NJ data elements of said data matrix is being shifted into said first input shift register,
wherein N, J, K and M are integers greater than one and N is approximately equal to M/J.

2. A matrix multiplier circuit for multiplying matrix elements comprising:
an input shift register for sequentially receiving in bit parallel form over a period of NJ time units a set of NJ data elements comprising N rows from a first matrix,
multiplying means, operative while said set of NJ data elements is being received in said input shift register, for multiplying in parallel over a period of M time units another set of NJ data elements from N rows of said first matrix which was previously received in said shift register with elements from K columns of a second matrix to form a set of output elements of an output matrix,
where M, N, J and K are integers that are greater than one and M is approximately equal to NJ.

3. The circuit of claim 2 wherein said second matrix comprises constant transform coefficient elements.

4. The circuit of claim 2 wherein said multiplying means comprises a register having NJ register units for concurrently receiving said NJ elements of said other set in bit parallel form from said input shift register and for concurrently outputting said NJ elements in bit serial form over a period of M time units.

5. The multiplier circuit of claim 4 wherein said multiplier comprises
a plurality of memory means each of which stores all possible sums and differences of the elements of one column of said second matrix, each of said memory means being addressed by a pattern of J bits comprising one bit from each element in one of said N rows of data elements in each of said M time units to read out of each of said memory means one of the possible sums and differences of the elements of one column of said second matrix in each of said M time units, and
an accumulator connected to each memory means for accumulating the sums and differences read out of each memory means.

6. A method for utilizing a matrix multiplier circuit to multiply matrix elements comprising the steps of,
over a period of NJ time units, sequentially shifting into an input shift register in bit parallel form a set of NJ data elements comprising N rows of J elements from a first matrix, each of said set of NJ elements having a precision of M bits,
while said set of NJ data elements is being shifted into said input shift register, over a period of M time units, multiplying in parallel another set of NJ data elements, comprising N rows of J elements each with precision of M bits which was previously shifted into said input shift register, with elements from K columns of a second matrix to form a set of output elements of an output matrix,
wherein M, N, J and K are integers greater than one and M is approximately equal to NJ.

7. The method of claim 6 wherein said parallel multiplying step utilizes distributed arithmetic.

* * * * *